(12) United States Patent
Tang Shun Kit

(10) Patent No.: US 9,854,878 B2
(45) Date of Patent: Jan. 2, 2018

(54) STRAP ADJUSTER DEVICE

(71) Applicant: Holmbergs Safety System Holding AB, Halmstad (SE)

(72) Inventor: Terence Tang Shun Kit, Hong Kong (CN)

(73) Assignee: Holmbergs Childsafety Holding AB (SE)

( * ) Notice: Subject to any disclaimer, the term of this patent is extended or adjusted under 35 U.S.C. 154(b) by 206 days.

(21) Appl. No.: 14/649,362

(22) PCT Filed: Dec. 5, 2013

(86) PCT No.: PCT/EP2013/075646
§ 371 (c)(1),
(2) Date: Jun. 3, 2015

(87) PCT Pub. No.: WO2014/086918
PCT Pub. Date: Jun. 12, 2014

(65) Prior Publication Data
US 2015/0320147 A1    Nov. 12, 2015

(30) Foreign Application Priority Data

Dec. 6, 2012  (SE) ...................... 1251382

(51) Int. Cl.
*A44B 11/12* (2006.01)
*B60N 2/28* (2006.01)

(52) U.S. Cl.
CPC .......... *A44B 11/125* (2013.01); *B60N 2/2812* (2013.01); *B60N 2002/2818* (2013.01); *Y10T 24/2151* (2015.01)

(58) Field of Classification Search
CPC ................ A44B 11/125; B60N 2/2812; B60N 2002/2818; Y10T 24/2151
(Continued)

(56) References Cited

U.S. PATENT DOCUMENTS 4,395,796 A   8/1983  Akaura et al.
4,679,852 A   7/1987  Anthony et al.
(Continued)

FOREIGN PATENT DOCUMENTS

EP   1078809 A1   2/2001
GB   2082279 A    3/1982

OTHER PUBLICATIONS

International Search Report and Written Opinion for Application No. PCT/EP2013/075646 dated Feb. 4, 2014.
(Continued)

*Primary Examiner* — Milton Nelson, Jr.
(74) *Attorney, Agent, or Firm* — Lerner, David, Littenberg, Krumholz & Mentlik, LLP

(57) ABSTRACT

The invention relates to an adjuster device (1) for adjusting the length and fastening of a web type strap (12), and in particular to an adjuster device (1) intended to be used together with a child restraint harness as part of a child vehicle seat. The adjuster device according to the invention allows, when the adjuster is in the open, release position, the strap to be easily pulled and freely move through the adjuster in both directions whereas the strap, when the adjuster is in the closed, fastening position, is securely fastened (without any risk for slippage) while still allowing the strap to be easily tightened by pulling the strap in one direction only. The present device does not cause wear and tear of the web, prevents slippage and is easy to use.

17 Claims, 6 Drawing Sheets

(58) Field of Classification Search
USPC .................. 24/68 SD, 68 SB; 297/473, 468
See application file for complete search history.

(56) References Cited

U.S. PATENT DOCUMENTS

| | | | |
|---|---|---|---|
| 5,088,160 A | | 2/1992 | Warrick |
| 6,024,408 A | * | 2/2000 | Bello .................. B60N 2/2806 24/68 CD |
| 2005/0225157 A1 | | 10/2005 | Patrizi et al. |
| 2005/0283951 A1 | | 12/2005 | Chang |
| 2006/0026803 A1 | * | 2/2006 | Chang .................... B25B 25/00 24/68 CD |
| 2008/0005469 A1 | | 1/2008 | Pherson et al. |
| 2008/0054691 A1 | | 3/2008 | Glover |
| 2012/0054989 A1 | | 3/2012 | Eisinger |

OTHER PUBLICATIONS

Swedish Search Report for Application No. ITS/SE12/00327 dated Jun. 4, 2013.

\* cited by examiner

STRAP ADJUSTER DEVICE

CROSS REFERENCE TO RELATED APPLICATIONS

The present application is a national entry under 35 U.S.C. §371 of International Application No. PCT/EP2013/075646 filed Dec. 5, 2013, published in English, which claims the benefit of and priority to Swedish Patent Application No. 1251382-6, filed Dec. 6, 2012, the entire disclosures of which are hereby incorporated by reference herewith.

TECHNICAL FIELD

The present invention relates to an adjuster device for adjusting the length and fastening of a web type strap, and in particular to an adjuster device intended to be used together with a child restraint harness as part of a child vehicle seat.

BACKGROUND

Child seats used in cars and other vehicles typically comprise a cushioned seat shell and an adjustable restraint harness for restraining and securing the child in the seat shell. The restraint harness typically comprises a first, a second and a third web strap forming a "Y" when the restraint harness is properly used. The first and second straps are when used arranged over a child's shoulders while the third strap is arranged between the child's legs. The first and second straps are generally releasably connected to a buckle to which also the third strap is attached. The other end of the third strap is generally fixedly secured to the seat. The first and second straps normally pass through slots provided in the back portion of the seat shell and are on the backside of the back portion fastened to a bracket or sewed together.

It is important to allow for adjustment of the length of the restraint harness in order to comfortably secure children of different sizes or even the same child with or without heavy clothes. It is well known in the art that this may be accomplished in many ways.

Generally, a fourth strap is attached to said bracket on the backside of the seat's back portion. Alternatively, the fourth strap may be sewed on the first and seconds straps. This fourth strap is arranged to extend forwardly through a slot formed in the seat portion. To allow for tightening or loosening of this strap, the strap normally extends through an adjuster device. Such an adjuster device is often referred to as a central (web or strap) adjuster. Loosening or tightening of the fourth strap via operation of the strap adjuster results in loosening or tightening of the harness, more specifically loosening or tightening of the first and second straps (shoulder straps).

Alternatively, the third strap may be pulled through an opening in the bottom of the seat shell and threaded under the seat portion to reach the adjuster device. When the third strap is tightened via operation of the adjuster device, the buckle is pulled downwardly and as a consequence thereof the first and the second straps are tightened. This configuration is rarely used nowadays.

This type of adjusters is normally configured to, when in its closed, fastening position, engage, stop or impede movement of the strap in one direction while still allowing the strap to be tightened by pulling the free strap end in the opposite direction. An important aspect of the adjuster is to impede the strap from slipping back through the adjuster device unless the adjuster is released.

There are many known types of web adjusters. A commonly used type is the cam adjuster, in which a rotating cam with a ridged surface compresses the web strap against an opposing surface to thereby secure the strap in a fastening position. An example of a cam type adjuster is illustrated in U.S. Pat. No. 4,679,852. A drawback with the cam type adjuster is that the cam ridges, which grab into the web while securing it, causes wear and tear of the web.

Another type of adjuster is illustrated in US 2008/0054691 (Glover). This web adjuster assembly uses a second plate hingedly biased against a first plate with a strap laced through an opening on the first plate and through openings on the second plate such that when the two plates are substantially resting against one another, friction prevents the strap from being pulled back through the web adjuster assembly.

While both cam adjusters and other adjusters are known in the art, there is still a need for an improved adjuster which fulfills the above mentioned requirements.

SUMMARY OF THE INVENTION

An object of the present invention is to alleviate the above problems and to provide an adjuster device which does not cause wear and tear of the web, prevents slippage and is easy to use. In particular, the adjuster device according to the invention allows, when the adjuster is in the open, release position, the strap to be easily pulled and freely move through the adjuster in both directions whereas the strap, when the adjuster is in the closed, fastening position, is securely fastened (without any risk for slippage) while still allowing the strap to be easily tightened by pulling the strap in one direction only.

According to a first aspect of the invention, there is provided an adjuster device for adjusting the length and fastening of a web type strap, and in particular to an adjuster device for use together with a child restraint harness as part of a child vehicle seat. The adjuster device according to the invention, more specifically the child restraint harness adjuster device according to the invention, comprises:

a base having a bottom frame extending in first plane, said base defining at least one longitudinally elongated slot, in particular at least two spaced apart parallel longitudinally elongated slots;

an operating handle comprising a first pin extending along a first axis, said operating handle being pivotally arranged to the base about a pivot axis being parallel to said first plane, and said operating handle being movable between a release position and a fastening position;

a second pin extending along a second axis being parallel to said pivot axis, said second pin being engaged in said slot and slidably movable therein between a first end position and a second end position;

wherein a strap entrance is defined between said second pin and the bottom frame such that a strap, having a free first strap end outside of the strap entrance, is receivable through the strap entrance, thence around the first pin and thence through a strap exit arranged in an adjacent relation to said bottom frame to thereby provide a second strap end connectable to a child restraint harness; and wherein the device being configured such that when the operating handle is in its release position, the second pin is freely movable in said slot between the first end position and the second end position, and when the operating handle is in its fastening position, the second pin is squeezed to said first end position (i.e. the second pin is squeezed downwards, towards the bottom frame) by parts of the strap brought into contact while still allowing the strap to be tightened by pulling the free first strap end in a first direction, whereas an increased tension on the second strap end causes a restraining action arising at least in part from friction between said parts of the strap.

In a particular embodiment of this device, said first axis and said second axis may be parallel and define a second plane, and said device may be configured such that when the operating handle is in its release position, the second plane forms a release position angle ($\alpha$) with the first plane to allow the strap to move freely in either direction and when the operating handle is in its fastening position, the second plane forms an fastening position angle ($\beta$) with the first plane to securely fasten the strap, the release position angle ($\alpha$) being at least 30° greater than the fastening position angle ($\beta$). In particular, the release position angle ($\alpha$) may be within the range of from 30 to 80°, such as from 30 to 70° or from 40 to 70° or from 50 to 70° or from 30 to 50°, greater than the fastening position angle ($\beta$).

In a further particular embodiment of this device, said first axis and said second axis may be parallel and define a second plane, and said device may be configured such that when the operating handle is in its release position, the second plane forms an angle of equal to or more than 30°, such as an angle within to range of from 30 to 90° or from 45 to 90° or from 60 to 90° or from 60 to 80°, with the first plane to thereby allow the strap to move freely in either direction and when the operating handle is in its fastening position, the second plane forms an angle of less than 30°, such as from 5 to 20°, with the first plane to thereby securely fasten the strap.

More particularly, the release position angle ($\alpha$) may be within to range of from 30 to 90°, such as 45 to 90° or 60 to 90° or 60 to 80°, and the fastening position angle ($\beta$) may be less than 30°, such as 5 to 20°, provided that the release position angle ($\alpha$) is at least 30° greater than the fastening position angle ($\beta$).

In a further embodiment of this device, said slot may extend at least partially in a direction substantially vertical to said first plane.

In a particular embodiment of said device, said longitudinally elongated slot may extend in a direction substantially vertical to said first plane, and the angle formed between the second plane and the first plane when the operating handle is in its release position may then advantageously be greater than the angle formed between the longitudinal centre line of the longitudinally elongated slot and the first plane.

According to a second aspect of the invention, there is provided a child vehicle seat including the above disclosed adjuster device, in accordance with the invention, to allow loosening and tightening of a child restraint harness.

Other features and advantages of the present invention will become apparent from the following description of the invention.

BRIEF DESCRIPTION OF THE DRAWINGS

Each of FIGS. 1a and 1b schematically shows a cross-view of a first embodiment of the adjuster device according to the invention, in which the strap end intended to be connected to the child restraint harness is passed in a downward direction, Y.

Figure 1A:
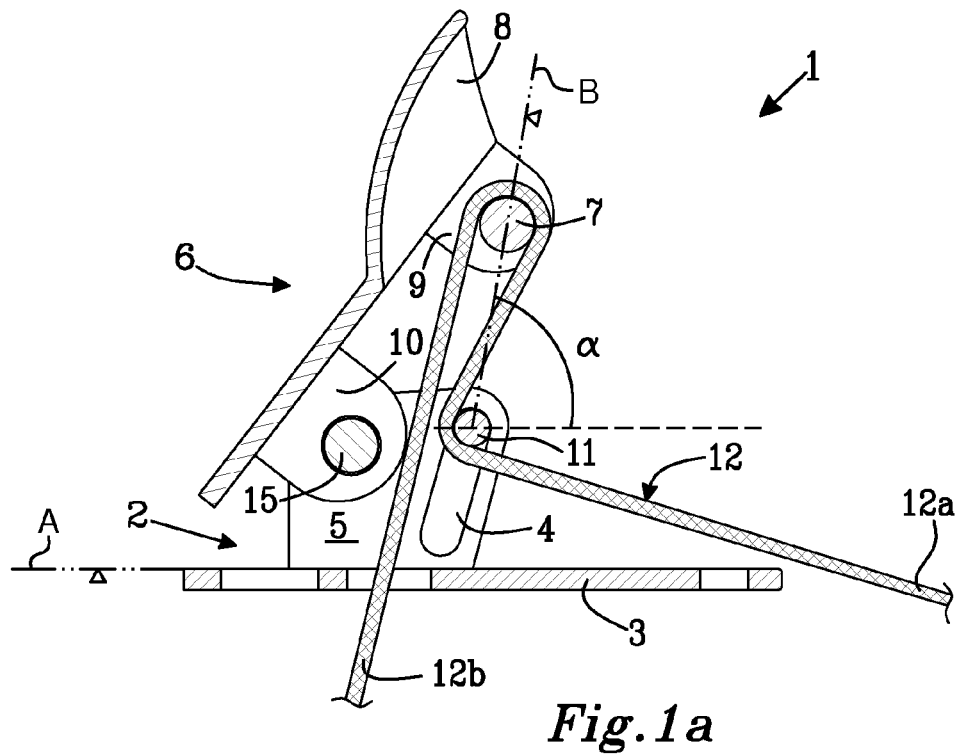
FIG. 1a shows the device in open position and FIG. 1b shows the device in closed position.
Figure 1B:
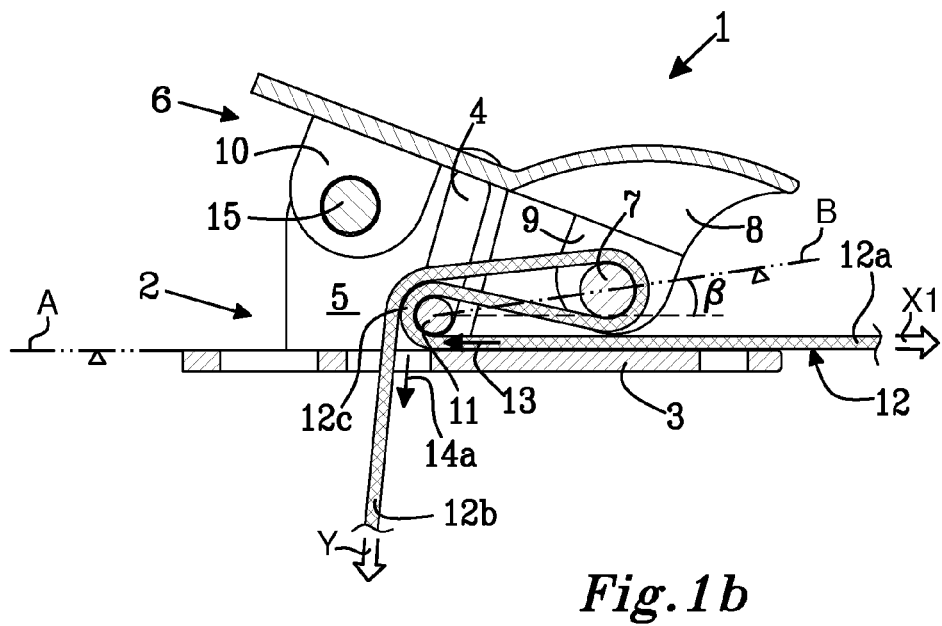
Figure 2A:
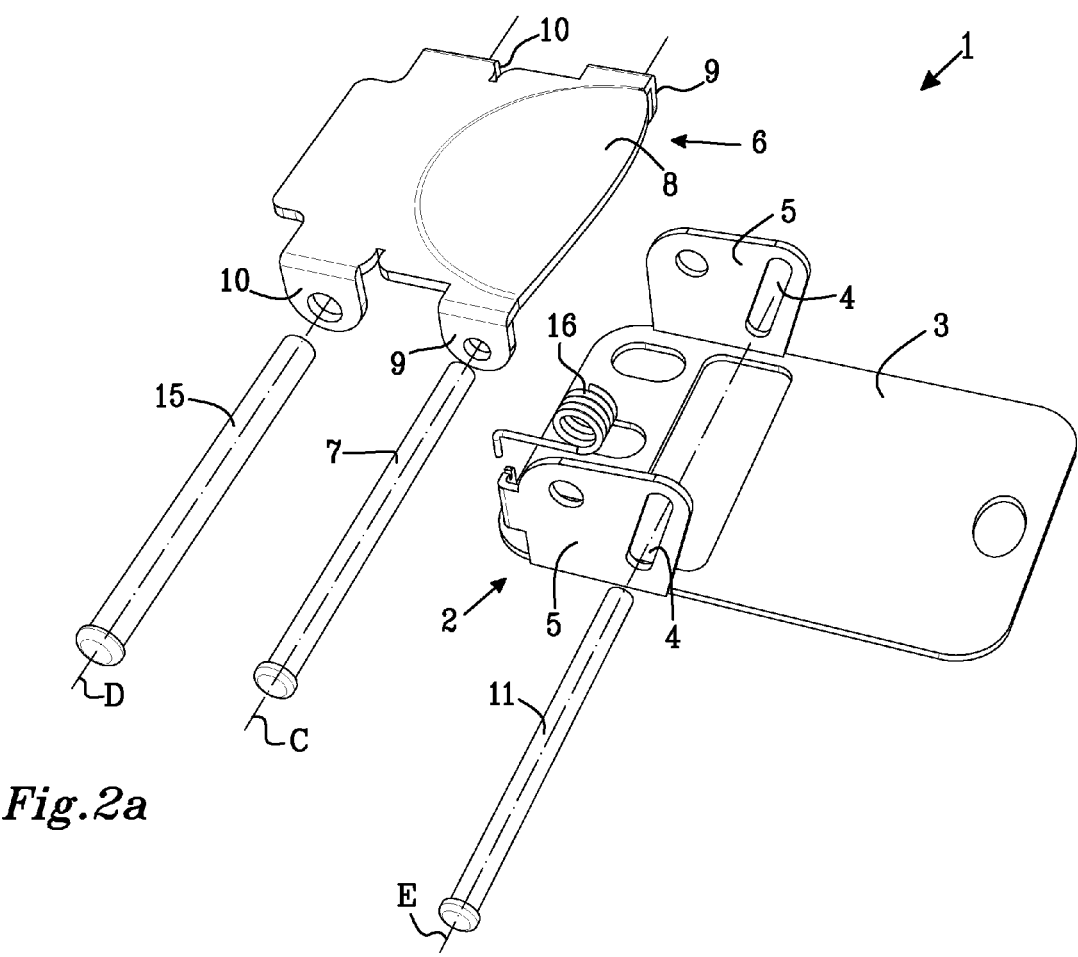
Figure 2B:
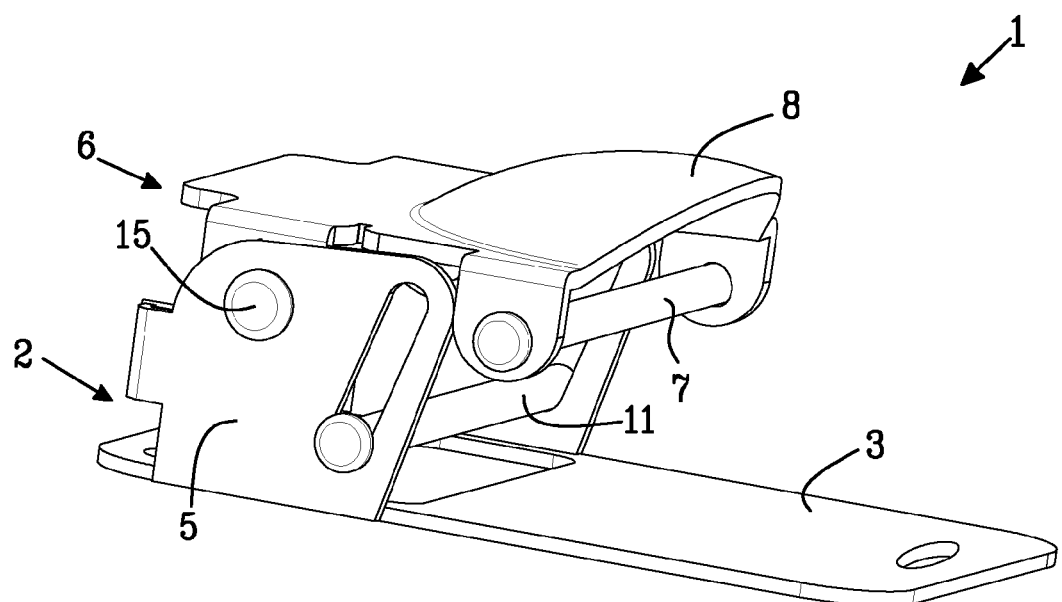

Each of FIGS. 2a and 2b schematically shows a perspective view on how the different parts of the adjuster device shown in FIGS. 1a and 1b are assembled.

Figure 3:
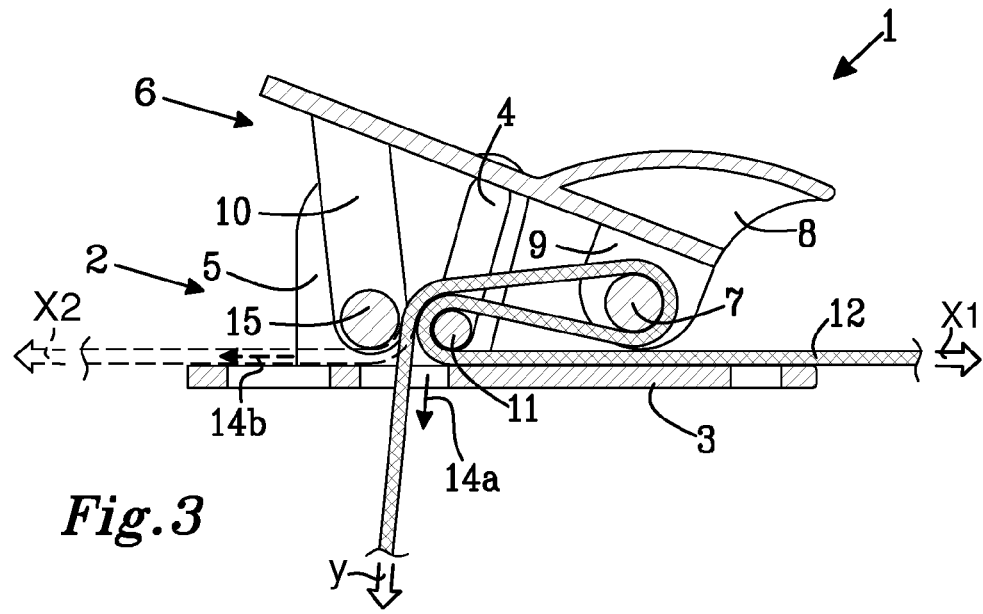
Figure 4:
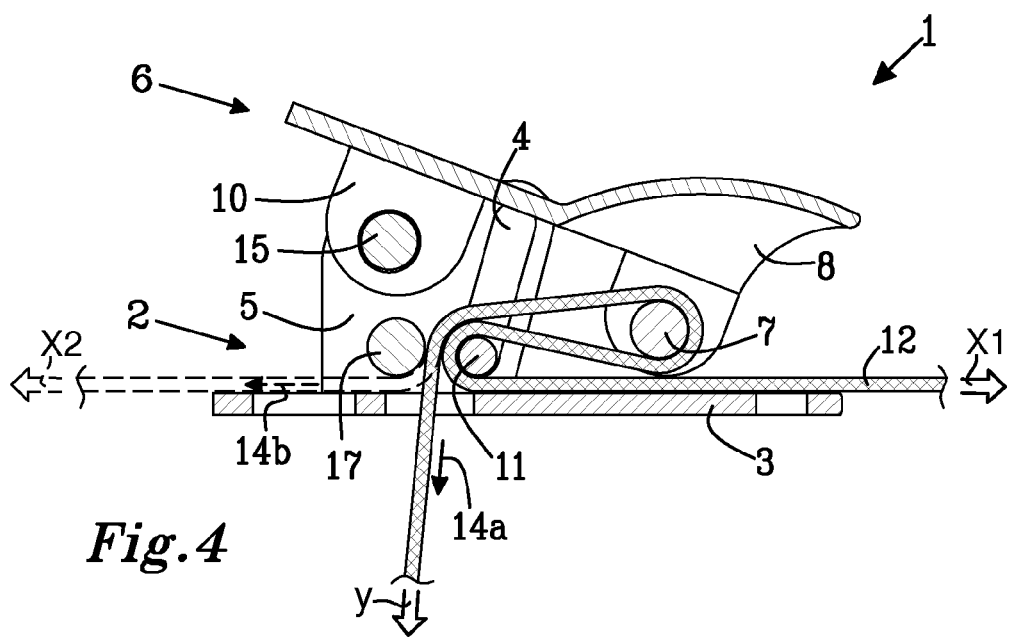
Figure 5:
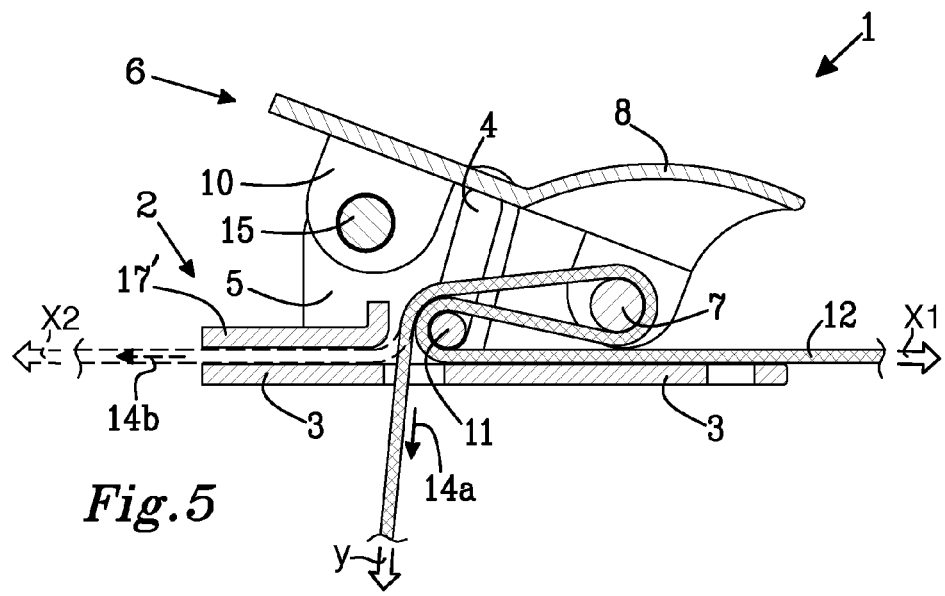

FIG. 3, FIG. 4 and FIG. 5 schematically show cross-views of further embodiments of the adjuster device according to the invention, in which the strap end intended to be connected to the child restraint harness either can be passed in a downward direction, Y, or in a backward direction, X2.

Figure 6:
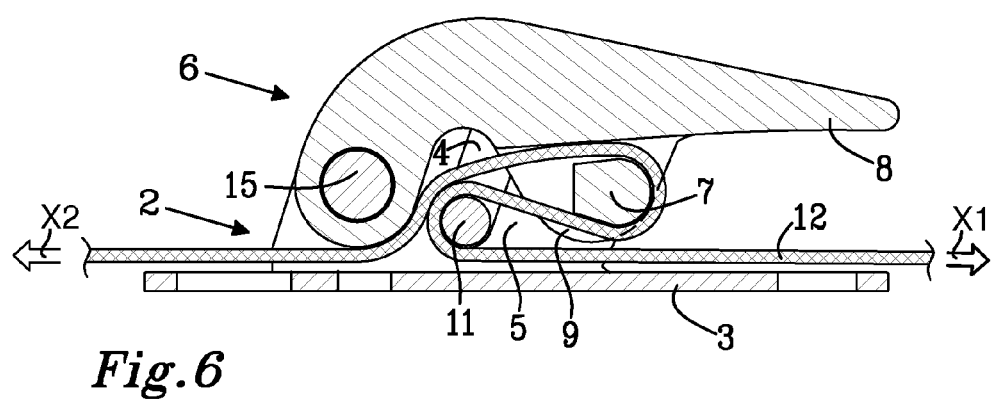

FIG. 6 schematically shows a cross-view of an embodiment of the adjuster device according to the invention, in which the second pin is integral with the operating handle.

Figure 7:
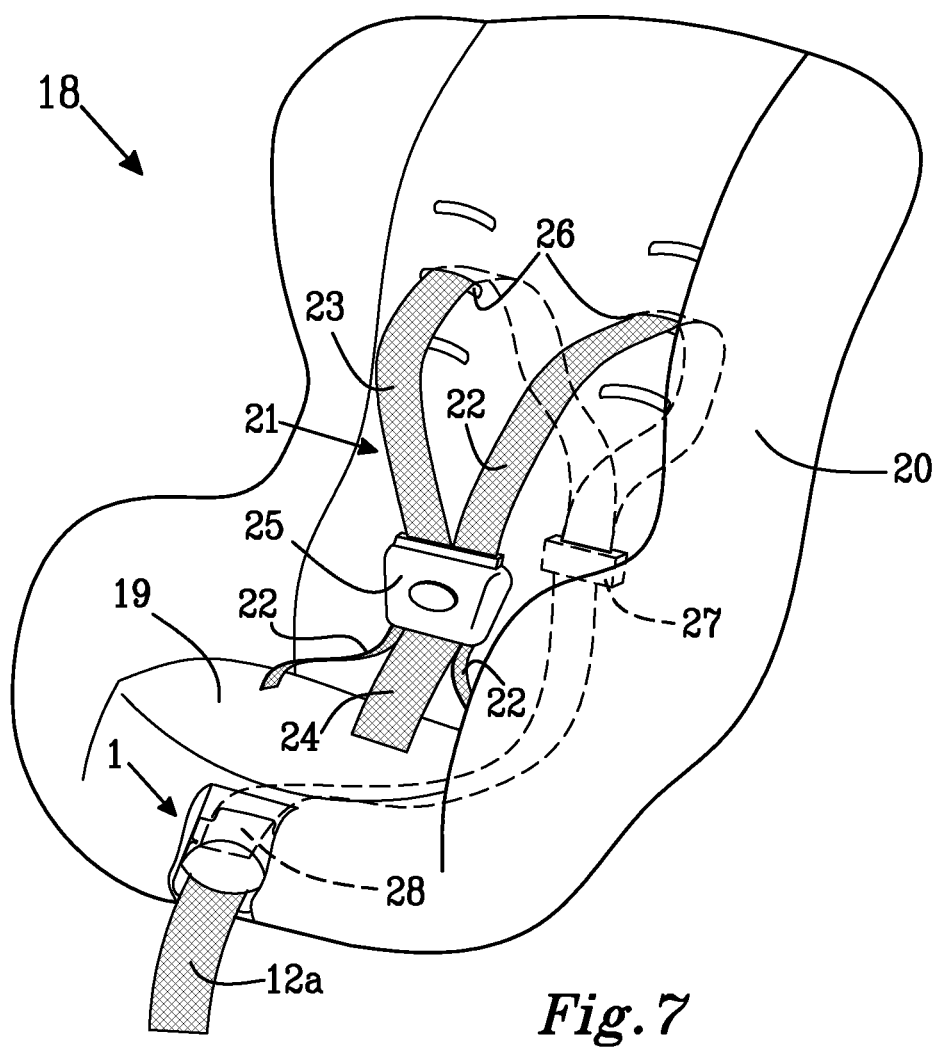

FIG. 7 schematically illustrates, in a perspective view, a child vehicle seat including an adjuster advice in accordance with the invention.

DETAILED DESCRIPTION OF THE INVENTION

While the following description of specific embodiments of the present invention is intended to provide an understanding of the principles and significant features of the present invention, it is not intended to limit the scope of the claimed invention.

With reference to FIG. 1, a first embodiment of an adjuster device 1 according to the invention is illustrated. The adjuster device 1 comprises a base 2 having a bottom frame 3 extending in first plane A, said base 2 defining at least one longitudinally elongated slot 4. In this embodiment, said slot 4 extends at least partially in a direction substantially vertical to said first plane A, and more particularly said slot 4 extends in a direction substantially vertical to said first plane A.

In this embodiment, the bottom frame 3 is a plate including one or more openings. It shall be noted that the bottom frame may be configured in other ways as well. For instance, the bottom frame may be composed of one or more crossbars. Still further, the bottom frame may comprise a first plate extending in a first plane and a second plate extending in a second plane parallel to said first plane.

Further, in this embodiment the base 2 includes a pair of spaced parallel side plates 5 upwardly projecting from said bottom frame 3, each side plate 5 having a longitudinally elongated slot 4 extending in a direction substantially vertical to said first plane A. Thus, in this embodiment said base 2 defines two longitudinally elongated slots 4 each one extending at least partially in a direction substantially vertical to said first plane A, and more particularly said base 2 defines two longitudinally elongated slots 4 each one extending in a direction substantially vertical to said first plane A. In this embodiment, said slots 4 are spaced apart and parallel.

The bottom frame 3 and the upwardly projecting, spaced parallel side plates 5 may be formed from any suitable wear-resistant material. For instance, this material may be a plastic material, such as glass-fiber reinforced polypropylene, or a metallic material, such as stainless steel.

The device 1 further comprises an operating handle 6 comprising a first pin 7 extending along a first axis C (see FIG. 2a), said operating handle 6 being arranged in relation to the base 2 to be pivotal about a pivot axis D (see FIG. 2a) being parallel to said first plane A, and said operating handle 6 being movable between an open, release position (shown in FIG. 1a) and a closed, fastening position (shown in FIG. 1b).

The operating handle 6 is pivotally arranged to the base 2 and movable between the release position and the fastening position. In this embodiment, the operating handle 6 includes said first pin 7, an upper handle member 8, a first pair of spaced parallel side members 9 and a second pair of spaced parallel side members 10 downwardly projecting from said handle member 8. In this embodiment is each side member 9, 10 in the form of a plate. It shall be noted that the first and second side members 9, 10 on the respective side of the operating handle 6 alternatively may be integral thus forming a single side member (e.g. plate) downwardly projecting on each side from said handle member 8.

In this embodiment, the first pin 7 laterally bridges said first pair of spaced parallel side members 9 (in this embodiment in the form of side plates).

In this embodiment, the first pin 7 is arranged to be movable (rotatable) about said first axis C.

When reference is made herein to a pin movable about its axis, it shall be noted that such pin also may be provided by a fixedly secured cross-bar arranged within a movable hollow sleeve. As used herein, the term "pin" includes also this type of configuration.

The first pin 7 provides a strap bearing surface and functions as a strap guide in the adjuster device 1.

The first pin 7 may be formed from any suitable wear-resistant material. For instance, this material may be a plastic material, such as glass-fiber reinforced polypropylene, or a metallic material, such as stainless steel. The outer surface of the first pin is generally smooth for facilitating smooth travel of the strap over the surface.

The other parts of the operating handle (i.e. the upper handle member 8, the first pair of spaced parallel side members 9 and the second pair of spaced parallel side members 10) may also be formed from any suitable wear-resistant material. For instance, this material may be a plastic material, such as glass-fiber reinforced polypropylene, or a metallic material, such as stainless steel.

The device 1 further comprises a second pin 11 extending along a second axis E (see FIG. 2a) being parallel to said pivot axis D, said second pin 11 being engaged in said slot 4 and slidably movable therein.

In this embodiment, the second pin 11 laterally bridges said pair of spaced parallel side plates 5 upwardly projecting from said bottom frame 3, and passes through the longitudinally elongated slots 4 thereof such that each end of the second pin 11 is engaged in one of the slots 4 and slidably movable therein between a first end position and a second end position.

In this embodiment, the second pin 11 is movable (rotatable) about said second axis E.

Also the second pin 11 provides a strap bearing surface and functions as a strap guide in the adjuster device 1.

The second pin 11 may be formed from any suitable wear-resistant material. For instance, this material may be a plastic material, such as glass-fiber reinforced polypropylene, or a metallic material, such as stainless steel. The outer surface of the second pin is generally smooth for facilitating smooth travel of the strap over the surface.

As shown in the Figures, the slot(s) 4 may be longitudinally elongated in a direction substantially vertical to said first plane A. As shown in the Figures, the slot(s) may be uniform along the longitudinal extension thereof. The slot(s) 4 may however have other forms as well (e.g. a curved, "banana-shaped" form) as long as the second pin 11 is slidably movable in the slot(s) 4 between a lower first end position (close to the bottom frame) and an upper second end position (close to the operating handle).

As used herein, the term "substantially vertical to" encompasses an angle within the range of from 60° to 90°.

As used herein, the term "substantially perpendicular to" encompasses an angle of 90°±20° (i.e. an angle within the range of from 70° to 110°).

As used herein, the term "substantially opposite to" encompasses an angle of 180°±20° (i.e. an angle within the range of from 160° to 200°).

In the adjuster device according to the invention, the longitudinal centre line of the longitudinally elongated slot (s) 4 may form an angle within the range of from 20° to 90° with said first plane A (this angle is herein referred to as slot angle). In particular, the longitudinal centre line of the longitudinally elongated slot(s) 4 may form a slot angle within the range of from 20° to 80°, such as 30 to 80° or 40 to 80°, with said first plane A. In embodiments where the longitudinally elongated slot(s) 4 extend(s) in a direction substantially vertical to said first plane A, the longitudinal centre line of the longitudinally elongated slot(s) 4 forms an angle within the range of from 60 to 90° with said first plane A.

In case the longitudinally elongated slot is non-uniform along the longitudinal elongation (e.g. "banana-shaped"), the slot angle is defined by drawing an intersecting line between the position of the second axis when in the first end position of the slot and the position of the second axis when in the second end position of the slot and then determining the angle between said line with the first plane A.

In particular, said first axis C and said second axis E are parallel and define a second plane B.

In particular, the device 1 is configured such that when the operating handle 6 is in its release position (see FIG. 1a), the second plane B (defined by said first axis and said second axis) forms an angle α≥30°, such as from 30 to 90° or from 45 to 90° or from 60 to 90°, with the first plane A (this angle is herein referred to as release position angle α) to allow the strap 12 to move freely in either direction and when the operating handle 6 is in its fastening position (see FIG. 1b), the second plane B forms an angle β<30°, in particular <20° (e.g. within the range of from 5 to 20°, such as from 5 to 15° or from 5 to 10°), with the first plane A (this angle is herein referred to as fastening position angle β) such that the second pin 11 is squeezed to the first end position of the slot (i.e. the second pin 11 is squeezed downwards) by parts of the strap 12c brought into contact while still allowing the strap 12 to be tightened by pulling the free first strap end 12a in a first direction X1 (herein referred to as forward direction), whereas an increased tension on the second strap end 12b causes a restraining action arising at least in part from friction between said parts of the strap 12. Said friction increases as the angle β between the second plane B with the first plane A decreases. A restraining action is also caused by the friction between the strap 12 and the bottom frame 3. As the second pin 11 is squeezed to the first end position of the slot 4, the strap 12 is squeezed towards the bottom frame 3.

Thus, when the operating handle 6 is in the open, release position, the strap 12 can be easily pulled and moves freely through the adjuster 1 in both directions. When the operating handle 6 is in the closed, fastening position, the strap 12 is securely fastened (without any risk of unintended slippage) while still allowing the strap 12 to be easily tightened by pulling the strap 12 in one direction only (in direction X1 as shown in FIG. 1b).

It shall be noted that each of the release position angle α and the fastening position angle β are, as shown in the Figures, defined as the angle between plane A and plane B facing the free strap end 12a.

Also the slot angle is defined as the angle facing the free strap end 12a.

It shall also be noted that the first axis C, the pivot axis D and the second axis E are all separate axis.

It shall further be noted that since the first pin 7 is part of the operating handle 6, the position of the first pin 7 is changed when the operating handle 6 is moved between the fastening position and the release position (and vice versa). When the operating handle 6 is in its release position, the first pin 7 is positioned almost straight above the second pin 11. When the operating handle 6 is in its fastening position, the first pin is positioned ahead of the second pin 11. Moreover, the second pin 11 is squeezed downwards, towards the bottom frame, thereby forcing each end of the second pin 11 to the lower first end position of the respective slot 4 by parts of the strap 12c brought into contact when the operating handle 6 is moved to its fastening position. When the operating handle 6 is in its release position, the second pin 11 is slidably movable in the slots 4 between the upper second end position and the lower end position thereof thereof (the position of the second pin 11 when the operating handle 6 is in its release position then depends on the force and direction thereof acting on the first strap end 12a).

In a particular embodiment, the release position angle α may be equal to or greater than the slot angle.

In a more particular embodiment, the release position angle α may be greater than the slot angle. For instance, the slot angle may be within the range of from 20 to 80° (e.g. from 30 to 80°) and the release position angle α may be within the range of from 30 to 90° (e.g. 45 to 90°) provided that the release position angle α is greater than the slot angle.

Thus, in a particular embodiment of the device 1 according to the invention, the angle α formed between the second plane B and the first plane A when the operating handle 6 is in its release position may advantageously be greater than the angle (i.e. the slot angle) formed between the longitudinal centre line of the longitudinally elongated slot 4 and the first plane A. This arrangement allows the strap 12 to move freely in either direction when the operating handle 6 is in its release position since among other things contact between different parts of the strap is avoided.

As shown in FIG. 1b, a strap entrance 13 is defined between said second pin 11 and the bottom frame 3 such that a strap 12, having a free first strap end 12a outside of the strap entrance 13, is receivable through the strap entrance 13, thence around the first pin 7 and thence through a strap exit 14a arranged in an adjacent relation to said bottom frame 3 to thereby provide a second strap end 12b connectable to a child restraint harness (not shown).

In this embodiment, the strap 12 is receivable underneath the second pin 11 in the gap formed between the second pin 11 and the bottom frame 3. The strap is threaded through the strap entrance 13, thence around the first pin and thence through the strap exit 14a without being intercrossed along the path thereof.

In the embodiment shown in FIGS. 1a and 1b, the strap exit 14a is provided by an opening in the bottom frame 3, through which strap exit 14a the second strap end 12b can be passed in a second direction Y substantially perpendicular to said first direction (herein referred to as downward direction).

The operating handle 6 of the device 1 may further comprise an additional pin 15 extending along the pivot axis. This additional pin 15 is herein referred to as the pivot pin 15. In the embodiment shown in FIGS. 1a and 1b, this pivot pin 15 laterally bridges said second pair of spaced parallel side members 10 of the operating handle 6 and said pair of spaced parallel side plates 5 upwardly projecting from said bottom frame 3, the pivot pin 15 thereby connecting the operating handle 6 to the base 2 and allowing said operating handle to pivot about the pivot axis D when moved from the fastening position to the release position (and vice versa). It may be noted that in this embodiment, the pivot axis D (here represented by the pivot pin 15) is when the operating handle 6 is in its fastening position positioned rearward of the second pin. The second pin 11 is in turn positioned rearward of the first pin 7 when the operating handle 6 is in its fastening position.

In this embodiment, said pivot pin 15 is fixedly secured about the pivot axis D.

The pivot pin 15 may be formed from any suitable wear-resistant material. For instance, this material may be a plastic material, such as glass-fiber reinforced polypropylene, or a metallic material, such as stainless steel.

FIGS. 2a and 2b illustrate the assembly of the device shown in FIGS. 1a and 1b.

Thus, an adjuster device 1 in accordance with the above disclosed embodiment of the invention comprises:

a base 2 having a bottom frame 3 extending in first plane and a pair of spaced parallel side members 5 upwardly projecting from said bottom frame 3, each side member 5 having a longitudinally elongated slot 4 extending in a direction substantially vertical to said first plane A;

an operating handle 6 comprising a first pin 7 extending along a first axis C, said operating handle 6 being pivotally arranged to the base 2 about a pivot axis D being parallel to said first plane A, and being movable between a release position and a fastening position;

a second pin 11 extending along a second axis E being parallel to said pivot axis D, said second pin 11 being engaged in said slots 4 and slidably movable therein between a first end position and a second end position;

wherein said first axis C and said second axis E are parallel and define a second plane B;

wherein a strap entrance 13 is defined between said second pin 11 and the bottom frame 3 such that a strap 12, having a free first strap end 12a outside of the strap entrance 13, is receivable through the strap entrance 13, thence around the first pin 7 and thence through a strap exit 14 arranged in an adjacent relation to said bottom frame 3 to thereby provide a second strap end 12b connectable to a child restraint harness; and wherein the device 1 being configured such that (i) when the operating handle 6 is in its release position, the second plane B forms an angle α of equal to or more than 30° with the first plane A such that the second pin 11 is freely movable in said slots 4 between the first and end position and the second end position to allow the strap 12 to move freely in either direction, and (ii) when the operating handle 6 is in its fastening position, the second plane B forms an angle β of less than 30° with the first plane A such that the second pin 11 is squeezed to said first end position by parts of the strap 12c brought into contact while still allowing the strap 12 to be tightened by pulling the free first strap end 12a in a first direction, whereas an increased tension on the second strap end 12b causes a restraining action arising at least in part from friction between said parts of the strap 12.

In particular, the angle α formed between the second plane B and the first plane A when the operating handle 6 is in its release position may be greater than the angle formed between the longitudinal centre line of each longitudinally elongated slot 4 and the first plane A (i.e. the slot angle).

The device 1 may further comprise biasing means, such as at least one tension spring, for biasing the operating handle towards the base 2, in particular towards the bottom frame 3. In the above disclosed embodiment, the biasing means comprises a tension spring 16 coupled to the operating handle 6 and the base 2 as shown in FIG. 2a (and FIG. 2b). As an alternative to said spring 16 any other resilient member may be used.

In a further embodiment shown in FIG. 3, a first strap exit 14a is provided by an opening in the bottom frame 3, through which strap exit 14a the second strap end 12b can be passed in a second direction Y (here referred to as downward direction) substantially perpendicular to said first direction X1. In addition, a second strap exit 14b is defined between the pivot pin 15 and the bottom frame 3, through which strap exit 14b the second strap end 12b can be passed in a third direction X2 (herein referred to as backward direction) substantially opposite to said first direction X1. In this embodiment, the pivot pin 15 is arranged adjacent to the bottom frame. The pivot pin 15 then also functions as a strap guide in the adjuster device 1. Thus, the outer surface of the pivot pin 15 is in this embodiment generally smooth for facilitating smooth travel of the strap 12 over the surface. The pivot pin 15 may be a fixedly secured pin or it may comprise a fixedly secured cross-bar arranged within a movable hollow sleeve. The pivot pin 15 is in the latter case movable about the pivot axis which may further facilitate smooth travel of the strap 12.

In an alternative embodiment shown in FIG. 4, the device 1 instead comprises a further additional pin 17, herein referred to as the third pin 17, extending along a third axis (not shown) parallel to said pivot axis D. In this embodiment, the third pin 17 is arranged adjacent to the bottom frame 3. A first strap exit 14a is provided by an opening in the bottom frame 3, through which strap exit 14a the second strap end 12b can be passed in a second direction Y (here referred to as downward direction) substantially perpendicular to said first direction X1. In addition, a second strap exit 14b is defined between the third pin 17 and the bottom frame 3, through which strap exit 14b the second strap end 12b can be passed in a third direction X2 (herein referred to as backward direction) substantially opposite to said first direction X1. It shall be noted that the device according to this embodiment comprises four pins, i.e. the first pin 7, the second pin 11, the third pin 17, and the pivot pin 15.

As used herein, a second direction which is "substantially opposite" to a first direction forms an angle of 180°±20 with said first direction.

In this embodiment, the third pin 17 is movable (rotatable) about said third axis.

Also the third pin 17 functions as a strap guide in the adjuster device 1.

The third pin 17 may be formed from any suitable wear-resistant material. For instance, this material may be a plastic material, such as glass-fiber reinforced polypropylene, or a metallic material, such as stainless steel.

The outer surface of the third pin 17 is generally smooth for facilitating smooth travel of the strap over the surface.

It shall be noted that the third axis is separate from the first axis C, the pivot axis D and the second axis E.

The adjuster devices 1 illustrated in FIGS. 3 and 4 may be used in both child seat configurations disclosed in the introduction. That is, the strap adjuster device 1 may be used to either tighten/loosen the fourth strap (extending through a slot formed in the seat portion of the child seat to the backside of the seat's back portion) or tighten/loosen the third strap (attached to the buckle to which also the shoulder straps are releasably coupled). In particular, the strap adjuster device 1 is suitable for use in the former configuration. The latter configuration is rarely used nowadays.

It shall be noted that the invention also, however, embraces the type of devices shown in FIGS. 3 and 4 provided without an opening in the bottom frame 3 (i.e. adjuster devices lacking said first strap exit 14a).

In a further alternative embodiment shown in FIG. 5, the device 1 comprises a guiding member 17'. This guiding member may be integrally formed with the base 2. The guiding member 17' is arranged adjacent to the bottom frame 3. In this specific embodiment, the guiding member comprises a plate extending in a plane parallel to the planar extension of the bottom frame. A first strap exit 14a is provided by an opening in the bottom frame 3, through which strap exit 14a the second strap end 12b can be passed in a second direction Y (here referred to as downward direction) substantially perpendicular to said first direction X1. In addition, a second strap exit 14b is defined between said plate of the guiding member 17' and the bottom frame 3, through which strap exit 14b the second strap end 12b can be passed in a third direction X2 (herein referred to as backward direction) substantially opposite to said first direction X1.

In the embodiments shown in FIGS. 1-5, the first pin 7 is movable about said first axis.

In a further embodiment of the adjuster device 1 shown in FIG. 6, the first pin 7 is fixed about said first axis. In particular, the first pin 7 is integral with the operating handle 6. In addition, the first pair of side members 9 and the second pair of side members 10 are also integral with the operating handle. Thus, the operating handle 6 including the upper handle member 8, the side members 9, 10 and the first pin 7 may be formed from a one-piece injection-moulded plastic material, for instance glass-fiber reinforced polypropylene, or a one-piece moulded metallic material, such as stainless steel. Parts of the upper handle member 8 facing the web type strap 12 may be provided with a textured surface, for instance ribs, in order to further safely secure the strap when the strap adjuster is in its fastening position. The pivot pin 15 may be fixedly secured about the pivot axis. The second pin 11 is engaged in the longitudinally elongated slot 4 and slidably movable therein between the end positions. The second pin 11 is also movable (rotatable) about its axis. In the embodiment shown in FIG. 6, a strap exit is defined between parts of operating handle 6 and the bottom frame 3, through which strap exit the second strap end can be passed in a backward direction X2 substantially opposite to the first direction X1. A further strap exit may also be provided by an opening in the bottom frame 3 to allow the second strap end to alternatively be passed in a downward direction Y substantially perpendicular to the first direction X1 in a similar manner as shown in FIG. 5. FIG. 7 shows, in accordance with the invention, a child seat 18 comprising a cushioned seat shell having a seat portion 19 and a back portion 20 integrally connected together, an adjustable child restraint harness 21 comprising web type straps 22, 23, 24 for restraining and securing a child (not shown) in the seat shell, where the restraint harness 21 is mounted to said seat shell, and an adjuster device 1 for adjusting the length and fastening of a web type strap 12 connectable to said child restraint harness 21 whereby operation of said adjuster device 1 allows loosening or tightening of the harness 21, wherein the adjuster device 1 is an adjuster device according to the invention.

In the configuration shown in FIG. 7, the child restraint harness 21 comprises a first 22, a second 23 and a third web type strap 24 forming a "Y" when the restraint harness 21 is properly used to secure a child in the seat shell. The first strap 22 and the second strap 23 are when used arranged over a child's shoulders while the third strap 24 is arranged between the child's legs. In a way known to persons skilled in the art, the first strap 22 and the second strap 23 are releasably connected to a buckle 25 to which also the third strap 24 is attached. The other end of the third strap 24 is in the embodiment shown in FIG. 6 fixedly secured to the seat portion 19. The first strap 22 and the second strap 23 each pass through a respective slot 26 provided in the back portion 20 of the seat shell and are on the backside of the back portion 20 fastened to a bracket 27. The other ends of the first 22 and second strap 23 are both fixedly secured to the seat portion 19.

It may be noted that the third strap 24 instead of being fixedly secured to the seat portion 19 (as shown in FIG. 7) may be attached to the adjuster device 1. However, this configuration is rarely used nowadays.

In the configuration shown in FIG. 7, a fourth web type strap 12 is attached to said bracket 27 on the backside of the seat's back portion 20. This fourth strap 12 is arranged to extend forwardly through a slot 28 formed in the seat portion 19. To allow for tightening or loosening of this strap 12, the strap 12 extends through the adjuster device 1. Loosening or tightening of the fourth strap 12 via operation of the strap adjuster 1 results in loosening or tightening of the harness 21, more specifically loosening or tightening of the first strap 22 and the second strap 23 (shoulder straps).

In an alternative embodiment (not shown), the third strap 24 may be pulled through an opening in the seat portion 19 of the seat shell and threaded under the seat portion 19 to reach the adjuster device 1. The third strap 24 may then be threaded through the adjuster device 1 leaving a free strap end which may be pulled in order to tighten the third strap 24. When the third strap 24 is tightened, the buckle 25 is pulled downwardly and as a consequence thereof the first strap 22 and the second strap 23 are tightened. However, this configuration is rarely used nowadays.

While the invention has been described in detail and with reference to specific embodiments thereof, it will be apparent for one skilled in the art that various changes and modifications can be made therein without departing from the spirit and scope thereof.

The invention claimed is:

1. An adjuster device (1) for adjusting a length and fastening of a web type strap (12), said device (1) characterized in comprising:
   a base (2) having a bottom frame (3) extending in a first plane (A), said base (2) defining at least one longitudinally elongated slot (4);
   an operating handle (6) comprising a first pin (7) extending along a first axis (C), said operating handle (6) being pivotally arranged to the base (2) about a pivot axis (D) being parallel to said first plane (A), and said operating handle being movable between a release position and a fastening position;
   a second pin (11) extending along a second axis (E) being parallel to said pivot axis (D), said second pin (11) being engaged in said slot (4) and slidably movable therein between a first end position and a second end position;
   wherein a strap entrance (13) is defined between said second pin (11) and the bottom frame (3) such that a strap (12), having a free first strap end (12*a*) outside of the strap entrance (13), is receivable through the strap entrance (13), thence around the first pin (7) and thence through a strap exit (14) arranged in an adjacent relation to said bottom frame (3) to thereby provide a second strap end (12*b*) connectable to a child restraint harness; and
   wherein the device (1) being configured such that when the operating handle (6) is in its release position, the second pin (11) is freely movable in said slot (4) between the first end position and the second end position, and when the operating handle (6) is in its fastening position, the second pin (11) is squeezed to said first end position by parts of the strap (12*c*) brought into contact while still allowing the strap (12) to be tightened by pulling the free first strap end (12*a*) in a first direction (X1), whereas an increased tension on the second strap end causes a restraining action arising at least in part from friction between said parts of the strap (12*c*).

2. An adjuster device (1) according to claim 1, wherein said first axis (C) and said second axis (E) are parallel and define a second plane (B), and said device (1) being configured such that when the operating handle (6) is in its release position, the second plane (B) forms an angle ($\alpha$) of equal to or more than 30° with the first plane (A) to allow the strap (12) to move freely in either direction and when the operating handle (6) is in its fastening position, the second plane (B) forms an angle ($\beta$) of less than 30° with the first plane (A).

3. An adjuster device (1) according to claim 2, wherein the release position angle ($\alpha$) is at least 30° greater than the fastening position angle ($\beta$).

4. An adjuster device (1) according to claim 2, wherein the angle ($\alpha$) formed between the second plane (B) and the first plane (A) when the operating handle (6) is in its release position is greater than the angle formed between the longitudinal centre line of said longitudinally elongated slot (4) and the first plane (A).

5. An adjuster device (1) according to claim 1, wherein said slot (4) is extending at least partially in a direction substantially vertical to said first plane (A).

6. An adjuster device (1) according to claim 1, wherein the first pin (7) is movable about said first axis (C).

7. An adjuster device (1) according to claim 1, wherein the first pin (7) is fixed about said first axis (C).

8. An adjuster device (1) according to claim 7, wherein the first pin (7) is integral with the operating handle (6).

9. An adjuster device according to claim 1, wherein the second pin (11) is movable about said second axis (E).

10. An adjuster device (1) according to claim 1, wherein a strap exit (14*a*) is provided by an opening in the bottom frame (3), through which strap exit (14*a*) the second strap end (12*b*) can be passed in a second direction (Y) substantially perpendicular to said first direction (X1).

11. An adjuster device (1) according to claim 1, wherein the operating handle (6) comprises a pivot pin (15) extending along the pivot axis (D).

12. An adjuster device according to claim 11, wherein a strap exit (14*b*) is defined between said pivot pin (15) and the bottom frame (3), through which strap exit (14*b*) the second strap end (12*b*) can be passed in a third direction (X2) substantially opposite to said first direction (X2).

13. An adjuster device according to claim 1, further comprising a third pin (17) extending along a third axis parallel to said pivot axis (D), wherein a strap exit (14*b*) is defined between said third pin (17) and the bottom frame (3), through which strap exit (14*b*) the second strap end (12*b*) can be passed in a third direction (X2) substantially opposite to said first direction (X1).

14. An adjuster device according to claim 1, further comprising a guiding member (17'), wherein a strap exit (14b) is defined between said guiding member (17') and the bottom frame (3), through which strap exit (14b) the second strap end (12b) can be passed in a third direction (X2) substantially opposite to said first direction (X1).

15. An adjuster device according to claim 1, further comprising biasing means (16) for biasing the operating handle (6) towards the base (2).

16. An adjuster device according to claim 15, wherein the biasing means (16) comprises at least one tension spring (16) coupled to the operating handle (6) and the base (2).

17. A child vehicle seat (18) comprising:
 a cushioned seat shell having a seat portion (19) and a back portion (20) integrally connected together;
 an adjustable child restraint harness (21) comprising web type straps (22, 23, 24) for restraining and securing a child in the seat shell, where the restraint harness is mounted to said seat shell; and
 an adjuster device (1) for adjusting a length and fastening of a web type strap (12) connectable to said child restraint harness (21) whereby operation of said adjuster device (1) allows loosening or tightening of the harness (21), characterized in that the adjuster device (1) is an adjuster device (1) according to claim 1.

* * * * *